Aug. 9, 1955     R. R. GUNDERSON     2,715,006

HOSE SUPPORT FOR VEHICLES

Filed July 2, 1952

*INVENTOR:*
RALPH R. GUNDERSON

BY:
Schroeder, Merriam,
Hofgren & Brady
ATTORNEYS:

United States Patent Office 2,715,006
Patented Aug. 9, 1955

2,715,006
HOSE SUPPORT FOR VEHICLES

Ralph R. Gunderson, Chicago, Ill.

Application July 2, 1952, Serial No. 296,897

4 Claims. (Cl. 248—160)

This invention relates to a spring mounted staff for holding tractor-trailer service hoses, and more particularly to an improved flexible support which is designed to permit the staff to swing laterally or rearwardly but will strongly resist forward tilting which would bring the staff in contact with the cab of the tractor.

The primary object of the invention is to provide a spring supported staff with a parallel auxiliary spring which assists the main spring in holding the staff upright and effectively prevents it being tilted in the wrong direction where it might strike the cab of the tractor.

The present invention is an improvement on the device shown in my application Serial No. 219,456, filed April 5, 1951.

The invention is illustrated in a preferred embodiment in the accompanying drawing, in which.

In the embodiment illustrated, a rigid base post 4 is threaded, and if preferred welded, to a bracket 5 which is adapted to be secured to a tractor frame 6 by means of bolts 7. The cab portion of the trailer is indicated at 8, and one of the purposes of the present device is to prevent the staff from tilting forwardly where it might strike the rear wall of the cab.

Figure 1:
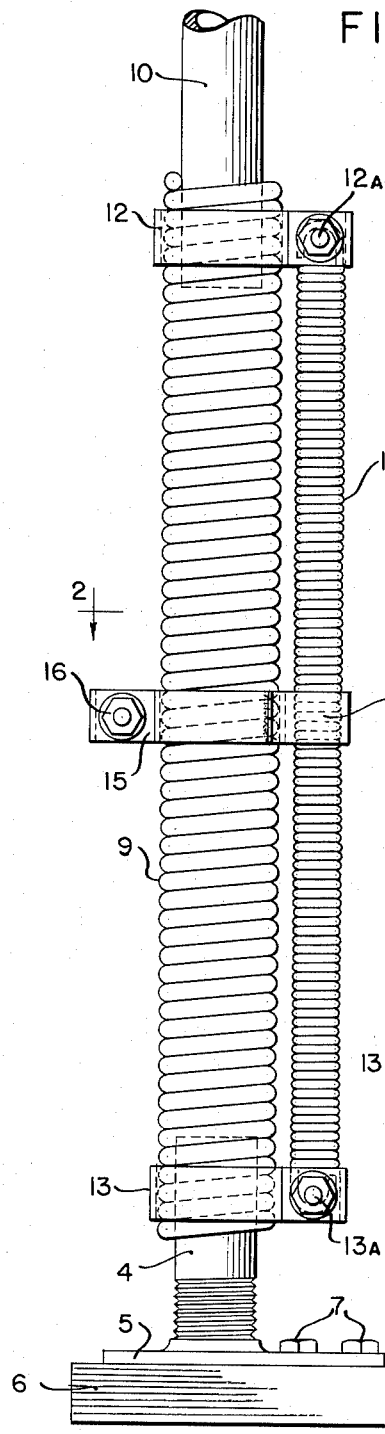
Fig. 1 is a fragmentary elevational view showing the device mounted on a tractor.

As shown in Fig. 1, a strong, closed-coil spring 9 fits over the base post 4 and makes a tight, frictional contact with it. Similarly, a light, tubular staff 10 fits into the upper portion of the spring 9.

The staff 10 may be provided at its upper end with rubber rings or other means for holding the slack portion of brake hoses, not shown.

The auxiliary closed-coil spring 11 is secured in offset parallel relation to the strong staff supporting spring 9. The spring 11 is preferably less than half the diameter of the spring 9 and accordingly, is less resistant to a tensile force. A top clamp 12 embraces the upper portion of the spring 9 and extends forwardly where a bolt 12a grips the upper end of the spring 11, with the top coil of the spring 11 engaging the lower side of the clamp 12 so that there is no clearance for lost-motion.

Figure 3:
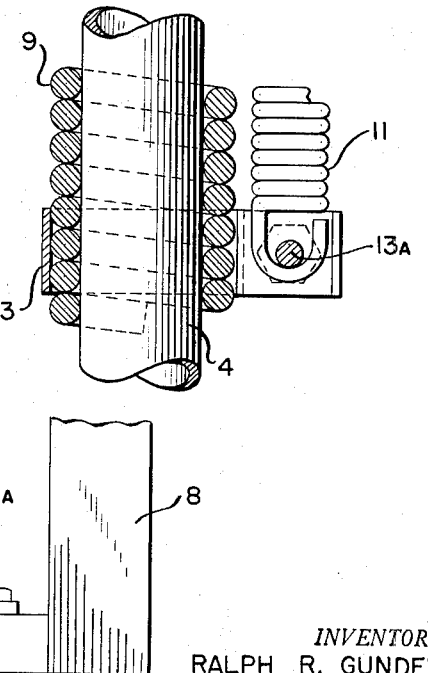
Fig. 3 is an enlarged fragmentary sectional view showing how the lower end of the auxiliary spring is secured to the main spring.

A bottom clamp 13 is similar to the upper clamp 12 and has a bolt 13a which secures the lower end of the auxiliary spring without any lost-motion clearance, as best shown in Fig. 3.

Figure 2:
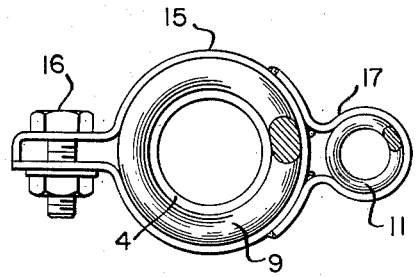
Fig. 2 is a plan sectional view of the guide clamp, taken as indicated at line 2—2 of Fig. 1.

As best shown in Fig. 2, a guide member 15 is provided near the center of the main spring 9 and is clamped firmly by a bolt 16. A loop member 17 is welded to the clamp but is large enough in diameter to permit the auxiliary spring 11 to slide through it.

When the device is installed on a tractor, the staff must be free to bend rearwardly when the vehicle goes around a corner. In normal operation it is never pulled straight back and it is important that it is not free to swing forwardly it will bang against the back of the cab, with resulting damage to the hose and cab. With the present construction, forward tilting is prevented because the closed-coil auxiliary spring can not be compressed and the clamps 12 and 13 serve as levers which would require the closed-coils of the spring 9 to be pulled apart, and this would require a great deal of force. On the other hand, to tilt rearwardly, the smaller diameter auxiliary spring can be pulled apart easily and permits the desired tilting. The construction is strong and durable, and the auxiliary spring assists the staff supporting spring in returning the staff to vertical position.

The foregoing detailed description is given for clearness of understanding only, and no unnecessary limitations should be understood therefrom, for some modifications will be obvious to those skilled in the art.

I claim:

1. A yielding support for vehicle hose lines, comprising: a strong, closed-coil, staff supporting spring having a lower end adapted to be secured in upright position to a tractor frame; a hose supporting staff having its lower end secured to the upper portion of said spring, the medial portion of said spring being freely flexible so that said staff is tiltable; a closed-coil auxiliary spring of smaller diameter than said staff supporting spring, said auxiliary spring being positioned in offset substantially parallel relation to the staff supporting spring; and separate members for rigidly securing the end portions of said auxiliary spring to the support above and below the freely flexible medial portion of said staff supporting spring, whereby less force is required to tilt the staff away from the auxiliary spring side of the staff than toward it.

2. A device as specified in claim 1, in which the separate members comprise a pair of clamps abutting the ends of the auxiliary spring.

3. A device is specified in claim 1, in which a guide member for said auxiliary spring is provided at the central portion of the staff spring.

4. A device as specified in claim 3, in which the guide member comprises a clamp which tightly embraces the staff spring, and a loop member is secured to said clamp and slidably receives the auxiliary spring.

References Cited in the file of this patent

UNITED STATES PATENTS

| | | |
|---|---|---|
| 547,731 | MacLearn | Oct. 8, 1895 |
| 1,458,916 | Sampson | June 12, 1923 |
| 1,726,817 | Franklin | Sept. 3, 1929 |
| 2,085,161 | Kraus | June 29, 1937 |
| 2,268,488 | Keeys | Dec. 30, 1941 |
| 2,296,175 | Morkoski | Sept. 15, 1942 |